United States Patent

Jung

[11] Patent Number: 6,069,789
[45] Date of Patent: May 30, 2000

[54] MOUNTING APPARATUS FOR AUXILIARY STORAGE DEVICE OF COMPUTER

[75] Inventor: Hae-soo Jung, Suwon, Rep. of Korea

[73] Assignee: SamSung Electronics Co., Ltd., Suwon, Rep. of Korea

[21] Appl. No.: 08/958,047

[22] Filed: Oct. 27, 1997

[30] Foreign Application Priority Data

Oct. 28, 1996 [KR] Rep. of Korea ...................... 96-49308

[51] Int. Cl.7 ............................... G06F 1/16; H05K 7/00; H05K 7/16
[52] U.S. Cl. ......................... 361/684; 361/685; 361/724; 361/726; 361/727; 312/223.2
[58] Field of Search .................................. 361/684, 685, 361/686, 724–727; 312/223.1, 223.2

[56] References Cited

U.S. PATENT DOCUMENTS

| | | |
|---|---|---|
| 5,218,760 | 6/1993 | Colton et al. . |
| 5,359,492 | 10/1994 | Porter . |
| 5,379,184 | 1/1995 | Barraza et al. .......................... 361/685 |
| 5,510,955 | 4/1996 | Taesang . |
| 5,557,499 | 9/1996 | Reiter et al. ............................. 361/686 |
| 5,563,450 | 10/1996 | Bader et al. . |
| 5,563,767 | 10/1996 | Chen . |
| 5,586,003 | 12/1996 | Schmitt et al. .......................... 361/684 |
| 5,587,854 | 12/1996 | Sato et al. . |
| 5,588,728 | 12/1996 | Eldridge et al. ...................... 312/223.1 |
| 5,654,873 | 8/1997 | Smithson et al. ........................ 361/685 |
| 5,668,696 | 9/1997 | Schmitt .................................... 361/685 |
| 5,721,669 | 2/1998 | Becker et al. ........................... 361/685 |
| 5,777,264 | 7/1998 | Chen ....................................... 361/685 |
| 5,797,667 | 8/1998 | Wu ....................................... 312/223.2 |
| 5,828,547 | 10/1998 | Francovich et al. .................... 361/685 |

*Primary Examiner*—Leo P. Picard
*Assistant Examiner*—Lisa Lea-Edmonds
*Attorney, Agent, or Firm*—Robert E. Bushnell, Esq.

[57] ABSTRACT

An apparatus for mounting an auxiliary storage device of a computer is disclosed. A guide rail is formed on the inner surface of a case of the computer. The case has an opening for installing the auxiliary storage device. A hooking piece is formed on the opening and a support bar is installed in the case across the opening. A body retainer on which the auxiliary storage device is fixed has a guide formed at the side portions thereof which slides along the guide rail. A front retainer pivotably installed at the leading edge of the body retainer has first and second locking members. The first locking member is hooked by the support bar and the second locking member which latches to the hooking piece.

14 Claims, 3 Drawing Sheets

കിക6,069,789

MOUNTING APPARATUS FOR AUXILIARY STORAGE DEVICE OF COMPUTER

CLAIM OF PRIORITY

This application makes reference to, incorporates the same herein, and claims all benefits accruing under 35 U.S.C. §119 from an application for Mounting Apparatus For Auxiliary Storage Device of Computer earlier filed in the Korean Industrial Property Office on Oct. 28, 1996 and there duly assigned Serial No. 49308/1996.

FIELD OF THE INVENTION

The present invention relates to an apparatus for mounting an auxiliary storage device of a computer which enables an auxiliary storage device to be installed in and removed from a main case of a computer.

DESCRIPTION OF RELATED ART

An auxiliary storage device such as a hard disk drive, a floppy disk drive or a CD-ROM drive built for a typical computer case is required to be easily and safely installed and removed therefrom when necessary. For example, U.S. Pat. No. 5,359,492 for a Latch Assembly For Modular Computer Component to Porter, U.S. Pat. No. 5,563,767 for a Drawer Type Hard Diskdrive Adapter to Chen, and U.S. Pat. No. 5,587,854 for a Case Unit Having a Dual Case Structure Formed by an Outer Case Member and an Inner Case Member for a Disk Storage Apparatus to Sato et al each disclose peripheral devices that are inserted and removed from a host device.

What is needed is an apparatus and a method for inserting and attaching a computer peripheral device to a host computer. What is also needed is an apparatus and method that allows the peripheral device to be locked to the host computer case in two locations using a single maneuver by the user.

SUMMARY OF THE INVENTION

To overcome the above problems, it is an objective of the present invention to provide an apparatus for mounting an auxiliary storage device in a computer by which the auxiliary storage device can be installed easily and conveniently in a computer case.

It is also an objective of the present invention to provide an apparatus and a method for attaching and locking the peripheral device to the main host computer in two different locations by two different methods using one maneuver by the user.

Accordingly, to achieve the above objective, there is provided an apparatus for mounting an auxiliary storage device of a computer which includes a guide rail formed on the inner surface of a case of the computer, the case having an opening for installing the auxiliary storage device, a hooking piece formed on the opening, a support bar installed in the case across the opening, a body retainer on which the auxiliary storage device is fixed, and a front retainer pivotably installed at the leading edge of the body retainer. The body retainer has a guide formed at the side portions thereof which slides along the guide rail and the front retainer has a first locking member which is hooked by the support bar and a second locking member which latches to the hooking piece.

It is preferred in the present invention that a slit is formed on the front retainer which allows easy gripping by a hand in order to pivot the front retainer such that the second locking member can be detached from the hooking piece, that the front retainer is hinge-coupled with the body retainer, and that a leaf spring is further included, which is fixed to the body retainer and elastically contacts the inner surface of the case.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
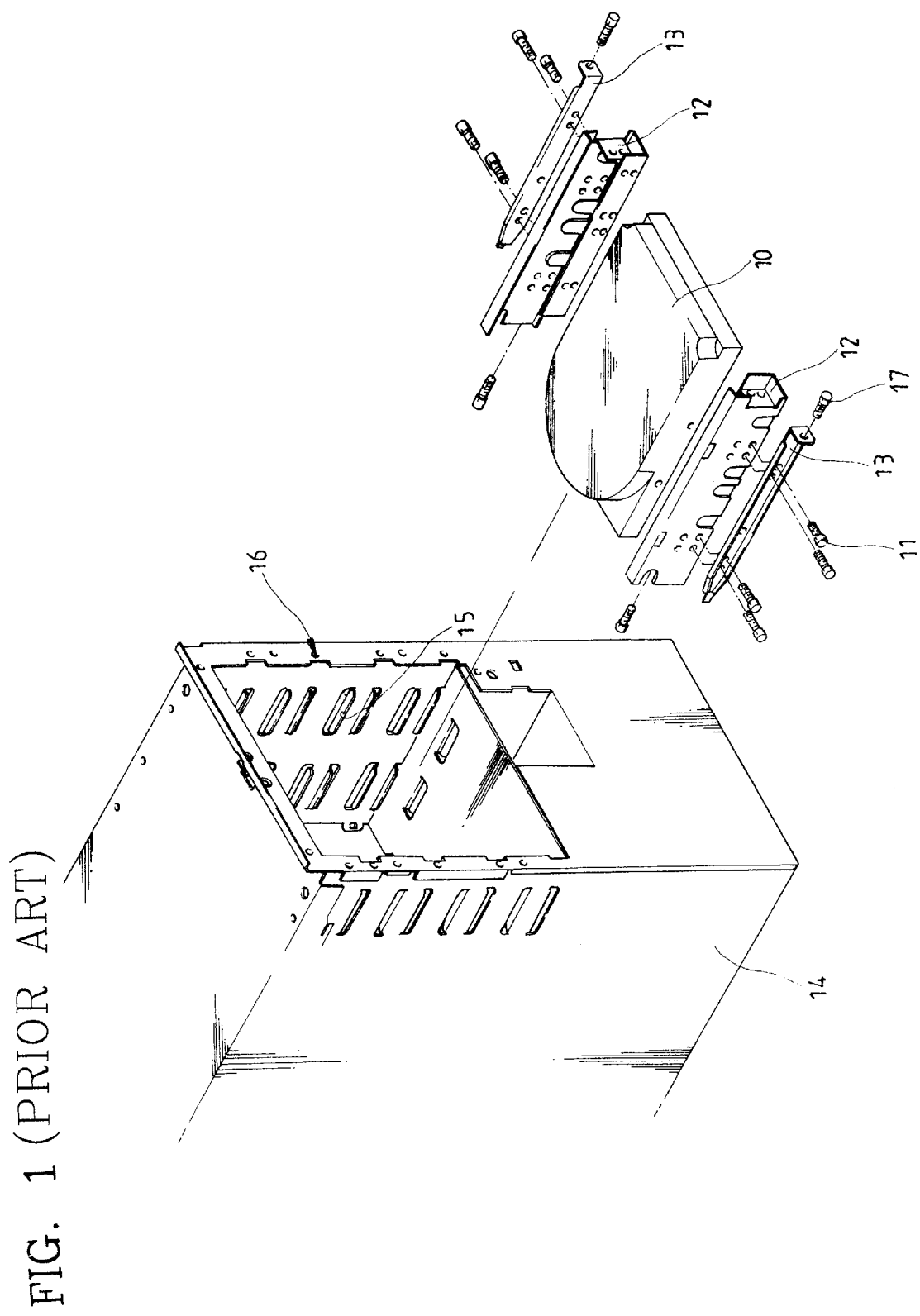
FIG. 1 is an exploded perspective view illustrating a computer having a conventional auxiliary storage device mounting apparatus.

Turning to the figures, FIG. 1 shows an apparatus for mounting a hard disk drive 10 in a base frame of a computer case. A pair of brackets 12 are fixed by screws 11 at opposing side surfaces of the hard disk drive 10. Also, bracket guides 13 are combined with the brackets 12.

The brackets 12 and the bracket guides 13 are usually formed of pressed metal so that both the bracket 12 and the bracket guide 13 are not flexible and have burr formed at the edges thereof Thus, the hard disk drive 10 cannot be stably installed in the case 14 and the sharp edges of the brackets 12 and the bracket guides 13 can injure the hands of a user.

The bracket guide 13 assembled to the hard disk drive 10 inserts along a guide rail 15 formed in the case 14 and then is fixed by a fixing screw 17 through a coupling hole 16, so that the hard disk drive 10 is securely fixed. However, it is inconvenient to install and remove the hard disk drive using the fixing screws.

Figure 2:
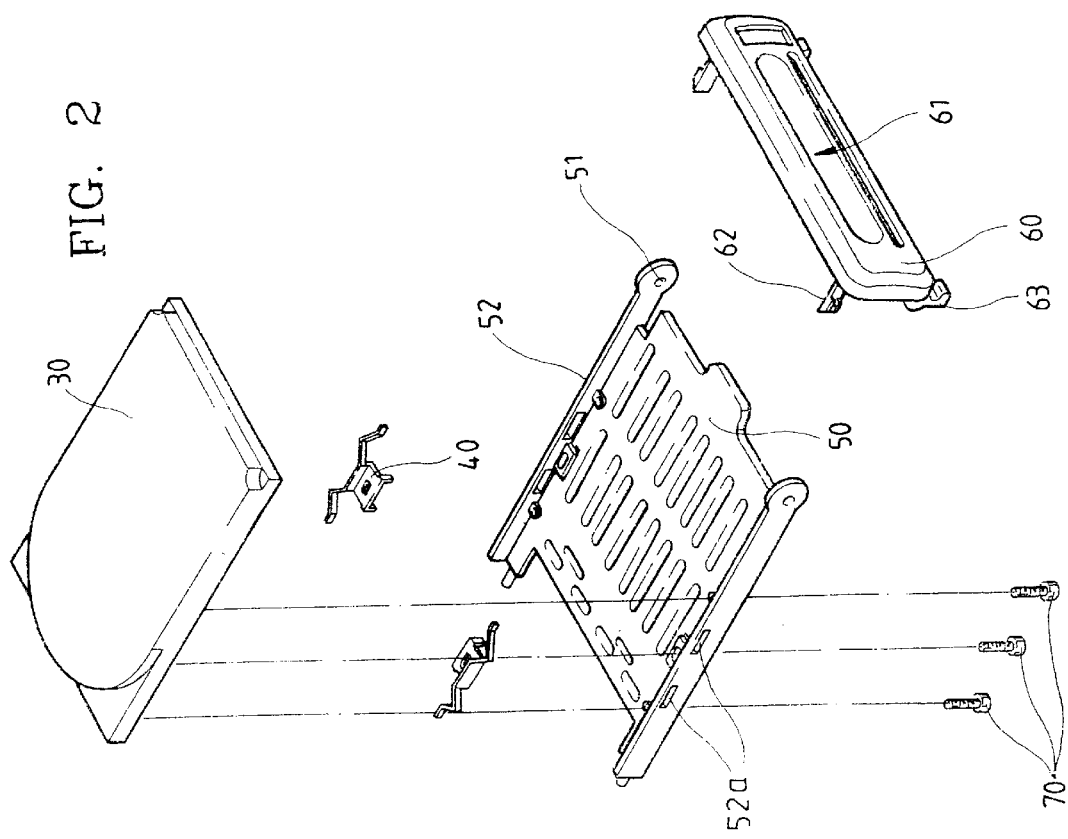
FIG. 2 is an exploded perspective view illustrating a computer having an auxiliary storage device mounting apparatus according to the present invention.
Figure 2:
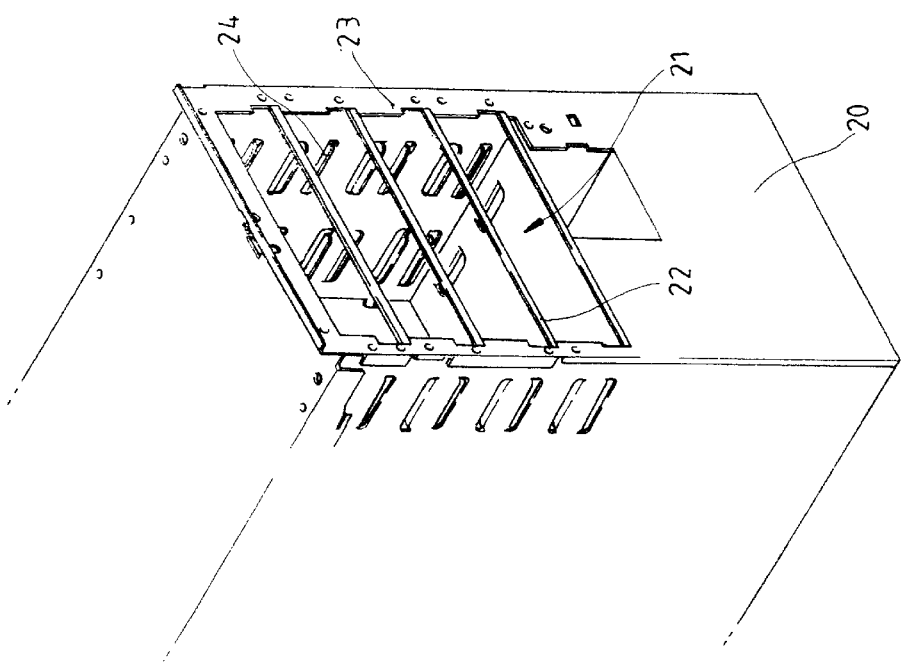
Figure 3:
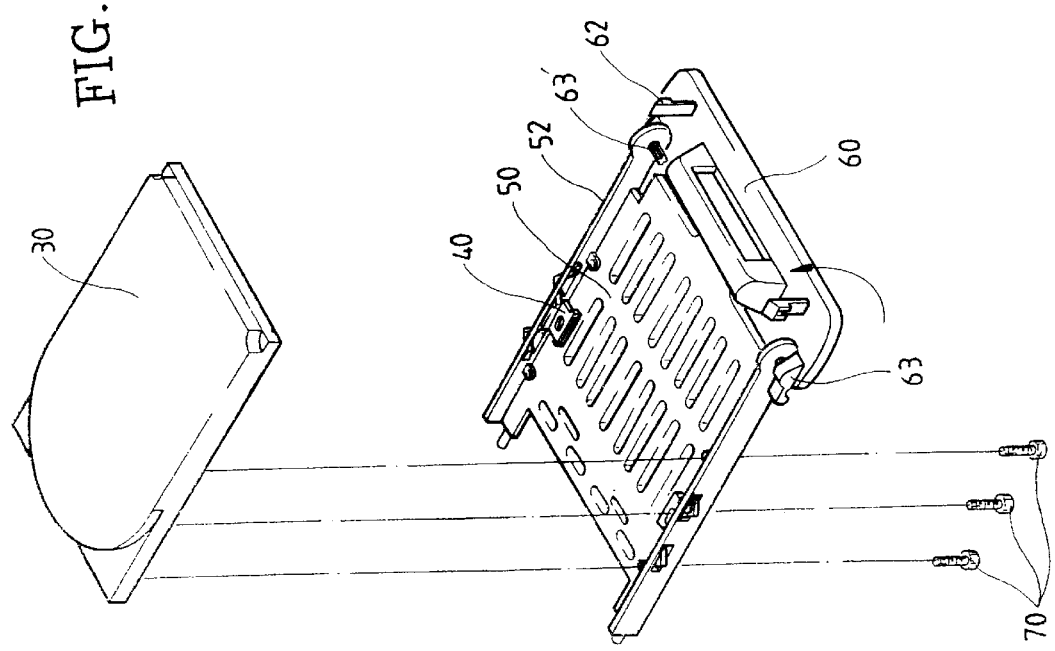
FIG. 3 is an exploded perspective view illustrating the auxiliary storage device mounting apparatus of the present invention in which the front retainer is combined with the body retainer shown in FIG. 2.
Figure 3:
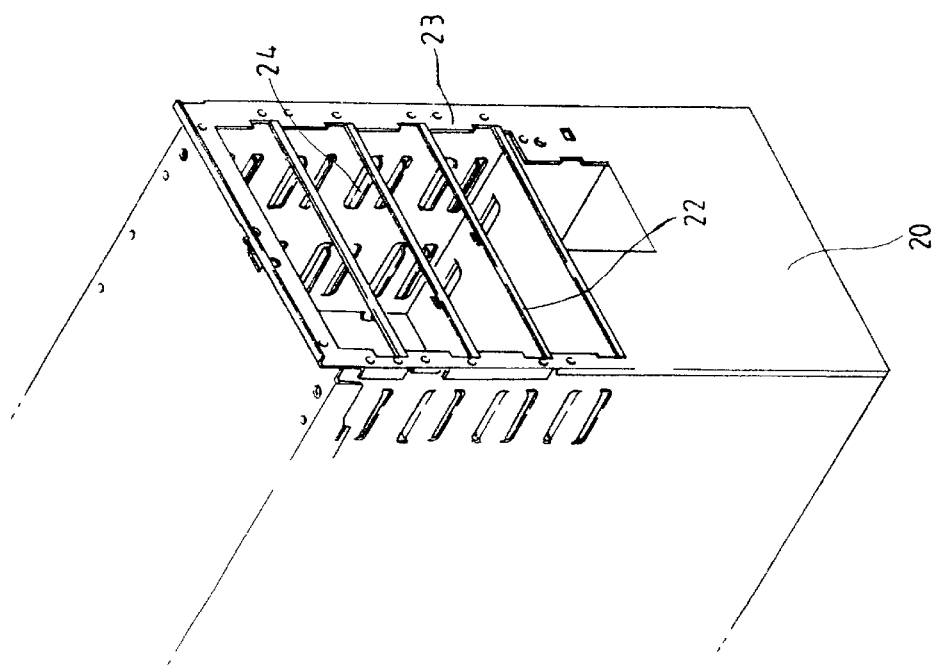

Referring to FIG. 2 and 3, in the apparatus for mounting an auxiliary storage device of a computer according to the present invention, an opening 21 is formed in the front side of a case 20 for installation of an auxiliary storage device 30. Hooking pieces 23 are formed at each side of the opening 21. Also, support bars 22 are installed across the opening 21 of the case 20 and guide rails 24 are formed on the inner side surfaces inside the case 20.

The auxiliary storage device 30 is installed through the opening 21 by being fixed to the mounting apparatus of the present invention. The mounting apparatus also includes a body retainer 50 and a front retainer 60. The body retainer 50 on which the auxiliary storage device 30 is fixedly mounted has a guide 52 formed at each side of the outer portion thereof which slides along the guide rail 24 formed in the case 20. A plurality of leaf springs 40 are installed at the inner side of the guide 52 and under the auxiliary storage device 30. As will be described later, the plurality of leaf springs 40 contact the inner surface of the case 20 via through-holes 52a formed in the guide 52, after the auxiliary storage device 30 is installed, so that horizontal vibrations acting on the auxiliary storage device 30 is dampened. Also, the plurality of leaf springs 40 prevent electromagnetic wave interference by grounding the auxiliary storage device 30 to the case 20.

The front retainer 60 is pivotably installed at the leading edge of the body retainer 50. A first locking member 63 which hooks around the support bar 22 and a second locking member 62 which latches to the hooking piece 23 are formed on the front retainer 60. The front retainer 60 is hinge-coupled with the body retainer 50 by inserting a hinge protrusion 63' (see FIG. 3) formed on the first locking member 63 into a hinge hole 51 formed in the guide 52. Also, a slit 61 which can be gripped by a hand is formed on the front retainer 60.

The auxiliary storage device 30 is fixed on the body retainer 50 by screws 70. Here, the leaf spring 40 disposed under the auxiliary storage device 30 and on the inner side of the guide 52 is fixed by the screw 70 between the auxiliary storage device 30 and the body retainer 50. Then, the body retainer 50 inserts into the case 20 through the opening 21 such that the guide 52 can slide along the guide rail 24. When the front retainer 60 is rotated in a direction indicated by an arrow shown in FIG. 3, the first locking member 63 is supported and stopped by the support bar 22 while the second locking member 62 latches to the hooking piece 23. Thus, the installation of the auxiliary storage device 30 is completed.

When the auxiliary storage device 30 is removed from the case 20, the front retainer 60 is pulled by inserting fingers into and gripping the slit 61. Then, the second locking member 62 is released from the hooking piece 23 while rotating to the initial position as shown in FIG. 3. Here, the first locking member 63 is detached from the support bar 22 so that the body retainer 50 and the auxiliary storage device 30 are removed out of the case 20 by pulling the front retainer 60.

As described above, by the mounting apparatus of an auxiliary storage device according to the present invention, the auxiliary storage device can be easily and conveniently installed in and removed from the computer case.

It is noted that the present invention is not limited to the preferred embodiment described above, and it is apparent that variations and modifications by those skilled in the art can be effected within the spirit and scope of the present invention defined in the appended claims.

What is claimed is:

1. An apparatus for mounting an auxiliary storage device of a computer comprising:
   a case of a computer having an inner surface and an opening for installing the auxiliary storage device;
   a guide rail formed on the inner surface of said case of said computer;
   a hooking piece formed on said opening;
   a support bar installed in said case across said opening;
   a body retainer wherein said auxiliary storage device built upon, said body retainer having side portions, said body retainer having a guide formed at said side portions thereof that slide along said guide rail; and
   a front retainer pivotably installed at the leading edge of said body retainer, said front retainer having a first locking member that is hooked by said support bar and a second locking member that latches to said hooking piece.

2. The apparatus for mounting an auxiliary storage device of a computer as claimed in claim 1, wherein a slit is formed on said front retainer that allows easy gripping by a hand in order to pivot said front retainer such that said second locking member can be detached from said hooking piece.

3. The apparatus for mounting an auxiliary storage device of a computer as claimed in claim 1, wherein said front retainer is hinge-coupled with said body retainer.

4. The apparatus for mounting an auxiliary storage device of a computer as claimed in claim 1, further comprising a plurality of leaf springs which are fixed to said body retainer and elastically contact the inner surface of the case.

5. The apparatus for mounting an auxiliary storage device of a computer as claimed in claim 4, wherein said plurality of leaf springs are formed of metal and said body retainer is formed of a non-metallic material.

6. A computer system, comprising:
   a computer case having an inner surface and an outer surface, a guide rail formed on said inner surface, said case having an opening, said opening having a hooking piece formed thereon, said opening having a support bar installed in said case across said opening; and
   a peripheral device having a body retainer wherein said peripheral device is attached to, said body retainer having side portions, each side portion having guides for sliding along said guide rail of said computer case, said body retainer having a front retainer pivotally attached to said body retainer, said front retainer having a first locking member that hooks onto said support bar, said front retainer having a second locking member that latches to said hooking piece.

7. The computer system of claim 6, wherein a slit is formed on said front retainer that allows easy gripping in order to pivot said front retainer such that said second locking member can be detached from said hooking piece.

8. The computer system of claim 6, wherein said front retainer is hinge-coupled with said body retainer.

9. The computer system of claim 6, further comprising a plurality of leaf springs which are fixed to said body retainer and elastically contact the inner surface of the case.

10. The computer system of claim 9, wherein said leaf spring is formed of metal and said body retainer is formed of a non-metallic material.

11. The method of installing a peripheral device into a host computer case, comprising:
   providing a host computer case with an opening, said host computer having an inner surface, a support bar installed across said opening, a hooking piece formed on said opening, and a guide rail formed on said inner surface of said case;
   providing a peripheral device having a body retainer having a front, a back, and a pair of sides, said peripheral device being built upon said body retainer, guides being formed along said side portions of said body retainer, and a front retainer that is pivotally attached to said front portion of said body retainer, said front retainer having first and second locking members;
   inserting said back portion of said body retainer of said peripheral device into said opening of said host computer case;
   positioning said guides formed on said sides of said body retainer onto said guide rail formed on said inner surface of said host computer case;
   sliding said guides of said peripheral along said guide rails of said host computer; and
   rotating upward said front retainer with respect to said body retainer allowing said first locking member to become attached to said support bar and said second locking member to become attached to said hooking piece.

12. The method of removing a peripheral device from a host computer case, comprising:

providing a host computer case with an opening, said computer case having an inner surface, a support bar installed across said opening, a hooking piece formed on said opening, and a guide rail formed on said inner surface of said case;

providing a peripheral device having a body retainer having a front, a back, and a pair of sides, said peripheral device being built upon said body retainer, guides being formed along said side portions of said body retainer, and a front retainer that is pivotally attached to said front portion of said body retainer, said front retainer having first and second locking members;

unhooking said first locking member from said support bar and unlocking said second locking member from said hooking piece;

rotating downward said front retainer with respect to said body retainer;

pulling on said body retainer causing said guides to slide along said guide rails; and removing said peripheral device from said host computer case.

13. An apparatus for mounting an auxiliary storage device of a computer comprising:

a case of a computer having an inner surface and an opening for installing the auxiliary storage device;

a guide rail formed on the inner surface of said case of said computer;

a hooking piece formed on said opening;

a body retainer wherein said auxiliary storage device is built upon, said body retainer having side portions, said body retainer having a guide formed at said side portions thereof that slide along said guide rail;

a plurality of leaf springs fixed to said body retainer by one or more bolts and elastically contact the inner surface of the case; and a front retainer pivotally installed at the leading edge of said body retainer, said front retainer having a first locking member that is hooked by said support bar and a second locking member that latches to said hooking piece.

14. The apparatus for mounting an auxiliary storage device of a computer as claimed in claim 13, wherein said plurality of leaf springs contact said inner surface of the case via through-holes formed in said guide.

* * * * *